Figure 1:
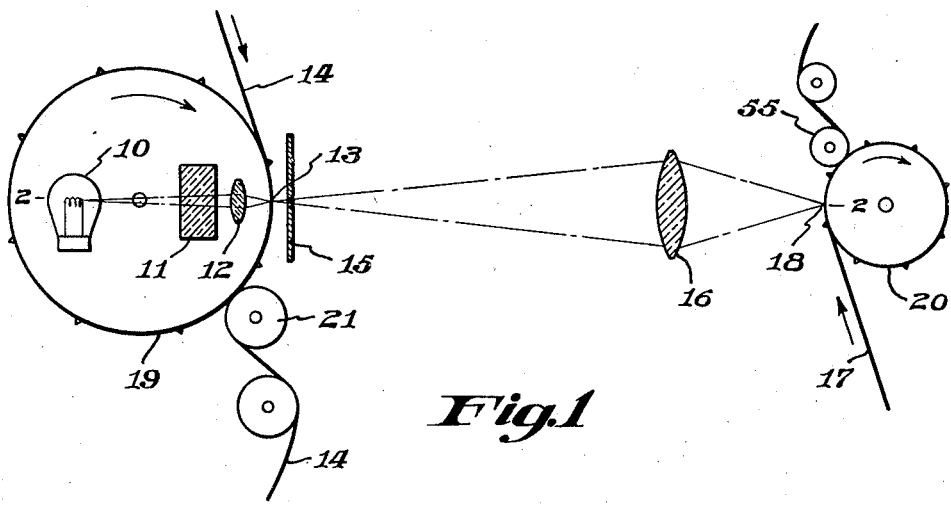

May 7, 1940.   E. W. KELLOGG   2,200,086
MOTION PICTURE PRINTER
Filed Feb. 26, 1937   2 Sheets-Sheet 1

INVENTOR
EDWARD W. KELLOGG
BY
ATTORNEY

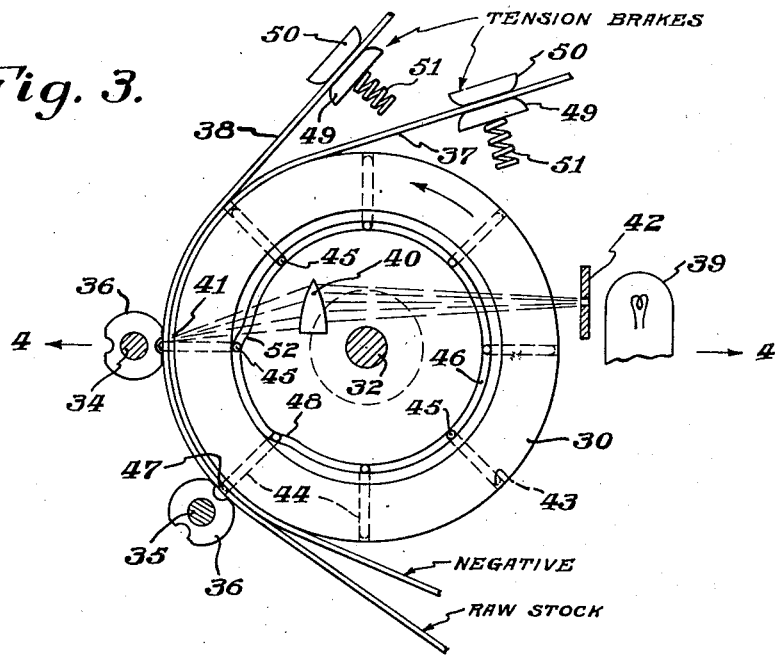
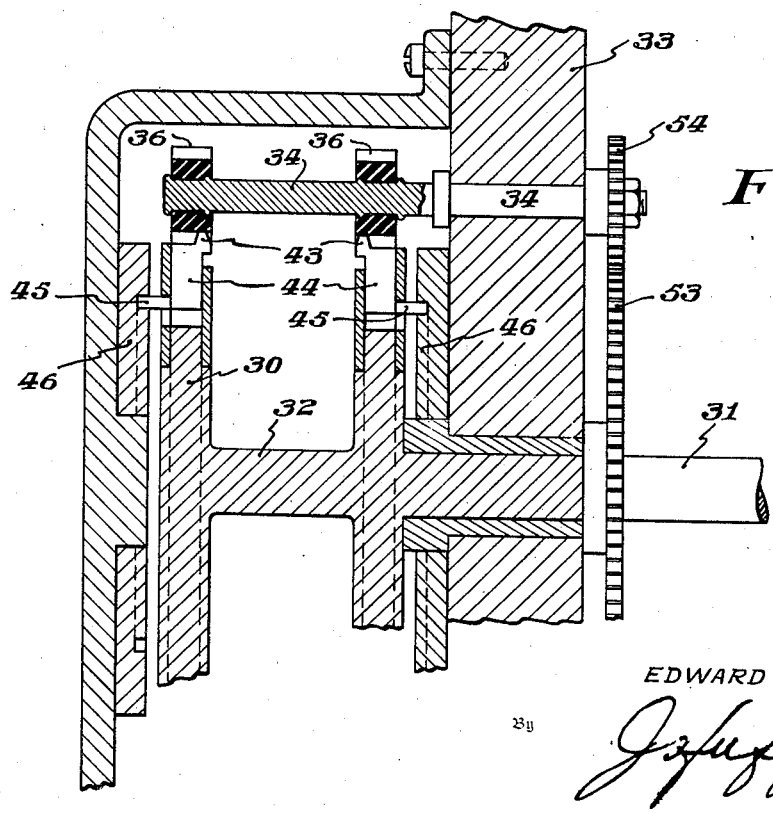

Patented May 7, 1940

2,200,086

UNITED STATES PATENT OFFICE 2,200,086

MOTION PICTURE PRINTER

Edward W. Kellogg, Moorestown, N. J., assignor to Radio Corporation of America, a corporation of Delaware Application February 26, 1937, Serial No. 127,838

5 Claims. (Cl. 95—75)

My invention relates to printers and more particularly to the type of printer used for the continuous printing of motion pictures.

Printers, in general, are of one or the other of two types, i. e., the continuous type, wherein both films are moved continuously past the printing point, and the intermittent or step type, where each frame of the picture is held stationary for a moment, each picture being printed while both films are stationary and the films being then moved to the next frame position.

In the step type of printer the image remains stationary during printing, but the machines are usually rather slow and are quite noisy, the vibration caused by the intermittent feed mechanism greatly limiting the speed of operation.

In continuous printers, on the other hand, an equally serious objection arises. In these printers, as heretofore manufactured, the film is pulled past the printing point by or over sprockets. Since motion picture film expands or contracts with variations in humidity as well as with age, it is impossible to make a sprocket which will handle different films, i. e., films having different characteristics as to moisture or age, equally satisfactorily, and the departures from uniform motion, or, in other words, movements of the films relative to each other, result in blurring, if the printing takes place when the films are both in motion, as is the case with continuous printers.

Throughout this specification, the term "negative" is used as referring to the exposed and developed film from which a print is to be made and the term "positive" is used as referring to the print made from the negative. However, I do not mean to limit the use of these terms to a photographic negative by using the term "negative" as referring to the film from which the print is made, whether it be an original photographic negative, a positive made therefrom, or a duplicate negative, and the term "positive" is likewise used in referring to any print so made.

In addition to the classification into continuous and step types, printers are also classified into the contact and projection types, in the former of which the negative film and positive stock are maintained in direct physical contact at the printing point, and in the latter of which an image of the negative is projected onto the positive. For the most part, contact printers are of the continuous motion type, while projection picture printers are of the step type. It is quite possible, however, to design a continuous projection printer, in which an optically produced image of a portion of the negative is projected on the positive film, on which the print is being made. This negative image travels with the positive film, and there should be no relative movement of the image and the film, if a clear sharp print is to result. Continuous projection printing is now applied on a commercial scale to sound tracks, with satisfactory results, but the same principle cannot well be applied to picture printing since it is important that the frame lines between pictures shall come directly opposite sprocket holes. The mechanical filters employed in the sound printers call for considerable tolerance in the longitudinal location of a given recorded material, this latitude or tolerance amounting, in many cases, to as much as a half an inch. This does no harm in the case of a sound print.

For the reason just explained, it is practically necessary in the case of a continuous picture printer (whether of the contact or the projection type) to propel both films through the printing aperture or apertures by means of sprockets. Any irregularities of movement due to sprocket tooth action cause relative displacements of the two films in contact, in the case of a contact printer, or relative movements of the negative image and the positive film, in the case of a projection printer, in either case giving rise to blurring of the printed picture.

The negative film, since it has already been printed, developed, fixed and dried, is, in general, somewhat shrunken and if it be relatively old, the shrinkage is much greater than if it were new, and it may even vary from one end of the reel of film to the other. The positive film stock, on the other hand, is usually fairly fresh and it may have been just freshly perforated so that the sprocket hole spacings are exactly the theoretically correct distance.

These variations in film length and film shrinkage cause the sprocket hole pitch to fail to coincide with that of the sprocket teeth, and there is, accordingly, a slight movement of the films relative to the sprocket and relative to each other as each sprocket tooth leaves the perforation, and the succeeding sprocket tooth takes up the driving of the film. So long as a given tooth (or pair of teeth) is pulling the film, the linear speed of the latter is determined entirely by the body diameter and speed of rotation of the sprocket, independently of the shrinkage of the film. But the average speed of the film varies with shrinkage, and the differences in average speed are taken care of by differences in the magnitude of the periodic readjustments, already described.

It should be understood that in this specification and also in the appended claims reference to the engagement or disengagement of any "tooth" may refer, in the case of films having two rows of sprocket holes, to any given pair of teeth which operates simultaneously at the two edges of the film.

Standard 35 mm. film has 4 sprocket holes per frame or 64 sprocket holes per foot, and if the film is moved continuously the aforesaid slippage of the film from one sprocket tooth to the next causes a slight relative movement of the films 4 times to each frame. If the printing aperture is relatively large, these separate blurs are indistinguishable but cause a general lack of definition over the entire area of the print. If the area being printed at any instant is confined to a very narrow rectangle, extending transversely to the film movement, the blurring effect of irregularities of motion is reduced, but instead there is distortion of the picture, various parts being stretched out or compressed. The narrowing of the printing aperture, which shortens the time of exposure, is analogous to taking a quick snapshot to avoid blurring when the subject is moving. In any case, it is evident that whether a narrow or wide rectangle is printed at a time, the picture quality is injured by any irregularities in movements of the films which result in any displacement of either film from the position which it ideally should occupy at any instant.

In accordance with my invention, I do not prevent all irregularities of motion, for this is impossible with sprocket propulsion, but I confine the effect of the irregularities to the frame lines or spaces between the pictures. This is accomplished in my improved printer, by printing by means of a narrow line or rectangle of light across the picture, and by using only one sprocket tooth per frame. The sprockets are so oriented in relation to the printing point that a sprocket tooth leaves the film while the frame line between the pictures is at the printing point, and any slippage of the film is therefore localized at the blank frame line without any deleterious effect within the area of the picture itself.

One object of my invention is to provide a picture printer which is capable of being operated at a very high speed.

Another object of my invention is to provide a continuous picture printer capable of producing pictures of superior quality, in definition and freedom from shape distortion, or irregularities of exposure resulting in streaks across the pictures.

Another object of my invention is to provide a continuous printer in which blurring is confined to the frame lines, or to a region so close to the frame lines as to be unobjectionable.

Another object of my invention is to provide a type of continuous projection printer which may be used either for enlarging or reducing.

Figure 2:
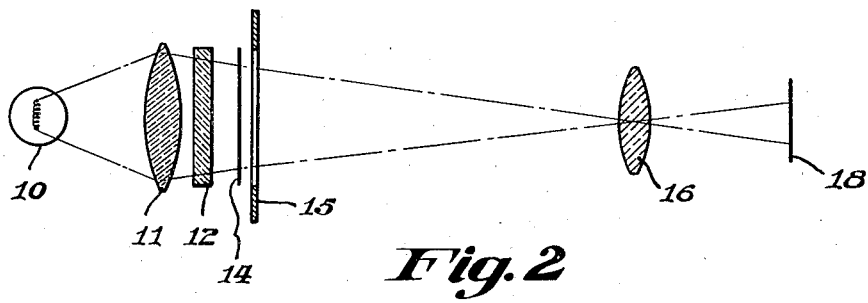

Other and incidental objects of my invention will be apparent to those skilled in the art from a reading of the following specification and inspection of the accompanying drawings in which Figure 1 is a diagrammatical longitudinal section of a projection printer made in accordance with my invention, Figure 2 is a transverse longitudinal section of a projection printer taken on the optical axis along the line 2—2 of Fig. 1, but with the sprockets omitted, Figure 3 is a vertical section through a contact printer made in accordance with my invention, and Figure 4 is a transverse section on the line 4—4 of Fig. 3.

Referring first to Fig. 1, a printing lamp 10, which is preferably of the coil filament incandescent type, is provided. Light from this lamp 10 passes through the vertical axis cylindrical lens 11, then through the relatively short focus cylindrical lens 12, which narrows the light into a small beam at the point 13 on the film 14. A slotted mask 15 is provided to prevent stray light from passing through the apparatus. This arrangement serves to limit the area being printed at any given instant to a narrow rectangle across the film, but there are numerous other arrangements of lenses or apertures which would accomplish the same purpose. An image of the illuminated area at 13 is focused by the lens 16 onto the film 17 at the point 18, where it produces a correspondingly narrow image. The films 14 and 17 are drawn over the sprockets 19 and 20 at appropriate relative speeds. The lens 16 is so located as to reduce (or enlarge) the image in the ratio of frame heights desired, which corresponds to the relative speeds of the two films. Thus the image of the negative, on the surface of film 17, moves through the printing point 18 at the same speed as the film itself.

In the present instance, the film 17 is illustrated as a conventional 16 mm. film, while the film 14 is illustrated as the conventional 35 mm. film. Although standard 16 mm. film has only one sprocket hole per frame, standard 35 mm. film is provided with four sprocket holes per frame, and all printers at present in use employ sprockets with enough teeth to engage all of the sprocket holes. In order to perform my invention, I provide, at the 35 mm. end of the device, only one sprocket tooth for each frame of the picture, and this is so located that when the sprocket tooth reaches the roller 21, where the film leaves the sprocket 19, the frame line of the picture will be at the point 13, thereby localizing at this point any longitudinal slip of the film which may occur when this tooth is disengaged and the next tooth begins to do the pulling. It has already been pointed out that the film speed, during the time that any one tooth is doing the pulling, is constant, independent of film shrinkage. It is therefore possible to design the machine and its optical system so that the optical ratio will exactly coincide with the film speed ratio during this interval.

As shown in Fig. 2, the cylindrical lens 11 serves as a condenser lens to direct the light from the lamp 10 onto the full picture width of the film, and the stop 15 permits light from this entire width to pass, thereby illuminating the corresponding portion of the width of the film 13.

It will be apparent that in the apparatus as described, both films will move continuously at a uniform speed past a printing point during the printing of the entire picture, due to the continuous engagement of the film with the particular sprocket tooth which happens to be pulling it. When the sprocket tooth engages or disengages and the film slips slightly to adjust itself to the next tooth, the printing aperture is at the frame line and no blur within the picture area occurs.

It is desirable to keep each of the films 14 and 17 under a slight tension on the side from which they feed toward the sprockets, in order that the film may be maintained firmly against the appropriate sprocket tooth at all times. This tension may be accomplished by any known means, such, for example, as a spring-pressed brake operating on an otherwise free sprocket over which the film runs, or by a spring shoe pressing lightly against the film, or any equivalent to these devices. It may be desirable, in order to permit easier readjustment of the films at the moment of transfer from one tooth to the next, to provide for a periodic relief of such pressure as may be exerted by rollers 21 and 55. This may be accomplished in the manner hereinafter described in connection with the contact printer. This refinement, however, will, in general, not be necessary, for the rollers 21 and 55 may be adjusted to just hold the film against the body of the sprocket without exerting enough pressure to materially resist the necessary slipping.

It is, of course, essential that the gearing or the common driving system (not shown) which determines the relative speeds of sprockets 19 and 20 shall be of a high order of accuracy in order that the exact speed ratio may be maintained throughout the printing of the picture. Since the shrinkage factor does not enter into the operation of the mechanical driving system, and the gears may be provided with as large a number of accurately fitting teeth as may be necessary, it is not difficult to construct a printer in which all inaccuracies due to the driving system will be very small compared with those which now result from misfits between sprockets and films.

The species of the invention, Figs. 3 and 4, shows a contact printer wherein the sprocket teeth are withdrawn at appropriate times to permit the films to slip into engagement with the next succeeding sprocket. The moment of disengagement of the pulling tooth can be determined by the position of the stripper or by whatever features of the design cause the film to leave the sprocket, but where a single sprocket carries both films, as in the case with contact printers, the stripping cannot be as accurately controlled as in the case of separate sprockets. Therefore, in the preferred form of my invention, as applied to contact printers, I provide the sprocket with retractable teeth, whereby the moment of withdrawal can be accurately determined. This measure serves to reduce the width of the slightly blurred area adjacent to the frame lines. In Figs. 3 and 4, the film supporting drum or sprocket is indicated at 30 and is carried upon the shaft 31 which passes through the frame 33 of the apparatus. The drum consists of two separated discs, as shown, connected by the hub 32. The frame also carries the shafts 34 and 35, which, in turn, carry resilient pressure rollers 36, which serve to hold the films in contact with the drum and with each other, in order to insure optimum printing. The negative film 37 and the positive film stock 38 pass over the surface of the drum 30, and light from the source 39 is directed by the prismatic lens 40 through the film 37 to the film 38 at the point 41.

A mask 42 may be provided adjacent the lamp 39 to secure a long narrow line of light transversely of the films, or the filament of the lamp 39 may be in the form of a long thin coil or a straight filament, in order to secure this same result.

The drum 30 is provided with retractable sprocket teeth 43, carried upon sliding bars 44, which are movable in appropriate recesses in the drum 30. Each of these slides is provided with a projecting pin 45, which extends through the corresponding side of the drum 30 and engages the slot in the corresponding stationary cam 46. It will be apparent that the contour of the slots in the cams 46 will cause the pins 45, and therefore the sprocket teeth 43, to move in or out at appropriate points during the revolution of the drum 30. The slot in each of the cams 46 is so contoured that any aligned pair of teeth 43 will engage the sprocket holes adjacent the point 41 when the line of light at the point 41 is at the frame line between picture areas. The next preceding pair of teeth 43, which would then be at the point 47, would be simultaneously withdrawn by the portion 48 of the slot in the cam, and the tooth adjacent the point 41 would thereby become the sole driving member.

Each film is provided with a pair of shoes 49 and 50, one of which is stationary and the other of which is pressed lightly by a spring, such as 51, against the film, thereby frictionally engaging the film and causing tension to be exerted longitudinally in the film against the action of the teeth 43 in the drum 30 which at any time tend to pull the film downwardly. This insures definite seating of the film against the pulling teeth.

The shaft 31 is provided with a gear 53, shown in Fig. 4, which engages a gear 54 on the shaft 34. This gearing causes the resilient rollers 36 to be so rotated in synchronism with the drum 30 that the transverse grooves in the tires of the roller 36 reach the position adjacent to the sprocket just as the teeth reach the position opposite roller 36. This prevents interference between the sprocket teeth and the tires of roller 36.

In addition to the grooves in the tires of roller 36, I have provided flat spots so positioned that there is no contact between the tires and the film at the moment that the readjustment or slipping of the film is desired. The absence of pressure at this moment permits the film to be retarded slightly by the brakes 49 and 50, so that both films will slip into firm engagement with the teeth 43 adjacent to the point 41. Since this slipping occurs during the time the frame line is being exposed, no blurring of the picture occurs. The films are then held in fixed relation to each other by means of the acting sprocket teeth, and are held firmly together and against the sprocket by the full-thickness part of the tires of the rollers 36, until the entire frame of the picture is printed as the film moves past the point 41. When the next succeeding frame line reaches the point 41, the driving sprocket teeth carrying the film will have reached the point 47, and the action will again be repeated.

It will be apparent from the foregoing that in each form of printer I have provided a means for permitting the necessary and inevitable slip of the films in relation to the sprocket drum and in relation to each other only during the time of exposure of the frame line, and for positively preventing any such slip during the exposure of the picture area, and that these conditions of operation are attained both in contact printing and in projection printing.

Having now described my invention, I claim:

1. Means for moving a motion picture film past an operational point including sprocket means having a plurality of teeth thereon adapted to engage the film, said teeth being so arranged that only one tooth is adapted to engage the film at a time, means for causing the film to be disengaged from the driving tooth and engaged by the next succeeding tooth when the frame-line between pictures is at the operational point, means for causing excess film tension in one direction whereby the force exerted on said film by said driving tooth is always in the same direction, and means for exerting normal pressure between said film and said sprocket means and for relieving said pressure at the moment of transfer of propulsion from one tooth to the next.

2. Means for moving a motion picture film past an operational point including sprocket means having a plurality of pairs of teeth adapted to engage perforations oppositely positioned at the two edges of said film, said pairs of teeth being so arranged that only one pair engages the perforations at a time, means for causing the film to be disengaged from the driving pair of teeth and engaged by the next succeeding pair of teeth when the frame-line between pictures is at the operational point, means for causing excess film tension in one direction whereby the force exerted on said film by said driving pair of teeth is always in the same direction, and means for exerting normal pressure between said film and said sprocket means and for relieving said pressure at the moment of transfer of propulsion from one pair of teeth to the next.

3. Motion picture printing apparatus including a film movement control sprocket provided with only one tooth per picture frame, means for causing disengagement of one tooth and engagement of the next tooth at the moment a picture frame line is in the path of the printing light, means for individually tensioning the printing and printed films whereby the teeth of said sprocket always exert force on said film in the same direction, and means for exerting normal pressure between said films and said sprocket means and for relieving said pressure at the moment of engagement and disengagement of said teeth with said film.

4. A printer for motion pictures including sprocket means for imparting substantially continuous motion to both films, said sprocket means being provided with teeth having a pitch substantially equal to the picture frame height, means for limiting the area being printed at any one time to a small fraction of the picture height, means for causing disengagement of said teeth to occur when the frame line is at the said limiting means, and means for exerting normal pressure between said films and said sprocket means and for relieving said pressure at the moment of engagement and disengagement of said teeth with said film.

5. Means for moving a motion picture film past an operational point including sprocket means having retractable teeth only one of which is adapted to engage the film at a time, means for causing the film to be disengaged from the driving tooth and engaged by the next succeeding tooth when the frame-line between pictures is at the operational point, means for causing excess film tension in one direction whereby the force exerted on said film by said driving tooth is always in the same direction, and means for exerting normal pressure between said film and said sprocket means and for relieving said pressure at the moment of transfer of propulsion from one tooth to the next.

EDWARD W. KELLOGG.